Nov. 11, 1969  A. N. TSERGAS  3,478,264
SCR, DIODE AND TRANSISTOR ANALYZER
Filed Jan. 31, 1968  2 Sheets-Sheet 1
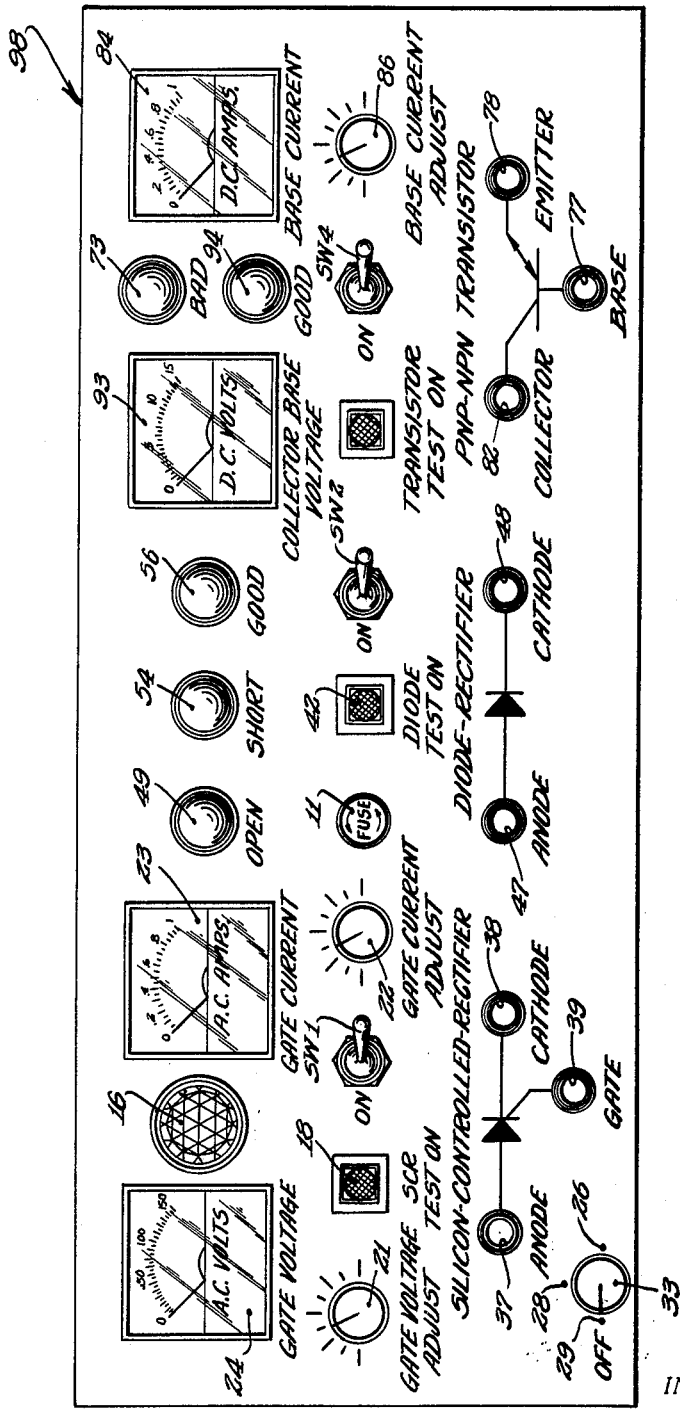
INVENTOR.
Athanase N. Tsergas
BY Hill, Sherman, Meroni, Gross & Simpson ATTORNEYS

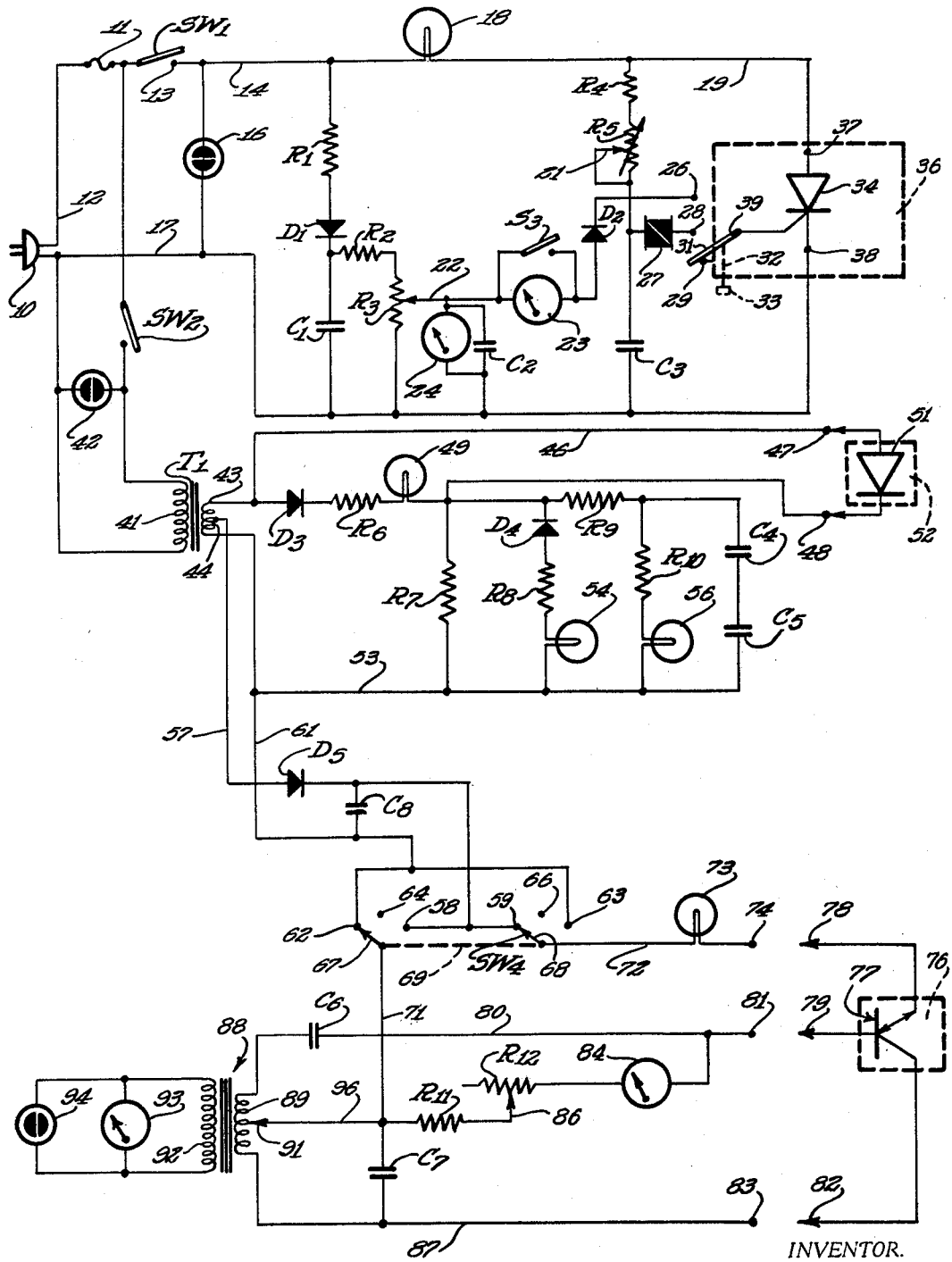

United States Patent Office 3,478,264
Patented Nov. 11, 1969

3,478,264
SCR, DIODE AND TRANSISTOR ANALYZER
Athanase N. Tsergas, Des Plaines, Ill., assignor to Ram Tool Corporation, Chicago, Ill., a corporation of Illinois
Filed Jan. 31, 1968, Ser. No. 701,939
Int. Cl. G01r 15/12
U.S. Cl. 324—73                                  8 Claims

ABSTRACT OF THE DISCLOSURE

A testing device for testing various components such as SCRs, diodes and transistors and which is capable of performing a number of different tests on each component. Selector switches allow various tests to be performed on the various components, including tests on SCRs for shorts, opens and general operating condition; tests on diodes for shorts or opens; and tests on transistors operated as an audio oscillator.

Background of the invention

*Field of the invention.*—The invention relates to a tester capable of performing a number of tests on a number of different components.

Summary of the invention

The invention consists of a tester into which a number of components may be connected to be tested. Selector switches allow various components and various tests to be performed.

The invention can test SCRs for shorts or opens and determine the operating characteristic. It may also be used to test diodes and transistors.

The invention comprises a tester to which the various components may be connected and tested.

It is an object of the invention therefore to provide a tester of a novel construction.

Another object is to provide an improved tester that may quickly and cheaply test a number of components.

Further objects, features and advantages of the invention will become apparent from the following description and claims when read in view of the drawings in which:

Brief description of the drawings

FIGURE 1 illustrates the tester of this invention, and FIGURE 2 is a schematic diagram of the invention.

Description of the preferred embodiments

FIGURES 1 and 2 illustrate the tester of this invention. A plug 10 may be inserted into any suitable power outlet, as for example, 110 volts A.C. to supply power to the tester.

A fuse 11 is connected to one lead 12 which connects to plug 10. A switch $S_1$ has its movable contact connected to fuse 11. Its stationary contact 13 is connected to a lead 14. An on-off light 16 for SCR test is connected between lead 14 and lead 17 which is connected to plug 10. A resistor $R_1$, a diode $D_1$ and a capacitor $C_1$ are connected in series between lead 14 and 17. An SCR test lamp 18 is connected in line 14. A resistor $R_4$, a variable resistor $R_5$ with a movable contact 21 and a capacitor $C_3$ are connected in series between leads 19 and 17.

Resistors $R_2$ and $R_3$ are connected parallel with capacitor $C_1$. A wiper contact 22 engages resistor $R_3$ and is connected to an ammeter 23. A switch $S_3$ is connected across meter 23.

A voltmeter 24 is connected from contact 22 to lead 17. A capacitor $C_2$ is connected across meter 24.

A diode $D_2$ is connected to ammeter 23 and to contact 26. A bidirection diode 27 is connected between contact 28 and wiper contact 21.

A switch contact 31 is engageable with contacts 26, 28 and a third contact 29. Contact 31 may be moved to engage various contacts by shaft 32 and knob 33.

A silicon controlled rectifier 34, to be tested, may be plugged into terminal board 36 such that its anode is electrically connected to lead 19 through contact 37. Its cathode is electrically connected to lead 17 through contact 38.

The gate electrode of the SCR is electrically connected through contact 39 to switch contact 31.

A transformer $T_1$ has its primary 41 connected between lead 17 and fuse 11, with a switch $SW_2$ connected between them.

A diode test pilot light 42 is connected across primary 41. One side 43 of secondary 44 is connected by lead 46 to diode test contact 47. A second diode test contact 48 is connected to the series combination of test light 49, resistor $R_6$ and diode $D_3$ to lead 46.

A diode 51 to be tested may be plugged into board 52 so that its anode engages contact 47 and its cathode engages contact 48.

A resistor $R_7$ is connected between contact 48 and lead 53 which is connected to the other side of secondary 44.

A diode $D_4$, resistor $R_8$ and test light 54 are connected in series between contact 48 and lead 53.

A resistor $R_9$, $R_{10}$ and test light 56 are also connected in series between contact 48 and lead 53. Condensers $C_4$ and $C_5$ are connected in series across resistor $R_{10}$ and light 56.

A transistor tester comprises a diode $D_5$ connected by lead 57 to the center tap of secondary 44. The other side of diode $D_5$ is connected to contacts 58 and 59 of switch $S_4$.

Lead 61 is connected to lead 53 and to contacts 62 and 63. A capacitor $C_8$ is connected between lead 61 and contact 58.

Contacts 62 and 63 are connected to lead 61. Moveable switch contacts 67 and 68 are coupled together by shaft 69 are engageable respectively with contacts 62, 64 and 58 and 59, 66 and 63.

Lead 71 is connected to contact 67, to a capacitor $C_7$ and to a lead 96.

Contact 68 is connected by a lead 72 to an indicator light 73. The other side of the light 73 is connected to test contact 74. A transistor 77 is mounted on board 76 and has its emitter connected to lead 78 which engages contact 74. The base of the transistor connects to lead 79 which engages test contact 81. The collector is connected by lead 82 to contact 83.

Lead 87 is connected to contact 83, capacitor $C_7$ and to one end of the primary 89 of transformer 88. The other side of primary 89 is connected to capacitor $C_6$. The other side of capacitor $C_6$ is connected to test contact 81 by lead 80.

An ammeter 84 has one terminal connected to contact 81 and its other terminal connected to a resistor $R_{12}$. A slide contact 86 engages resistor $R_{12}$ and is connected to resistor $R_{11}$. The other side of $R_{11}$ is connected to the center point 91 of primary 89.

The secondary 92 of transformer 88 is connected to a voltmeter 93 and an indicator light 94, that may be a neon type, for example.

FIGURE 1 illustrates the front panel 98 of the tester of this invention. The various lights, meters, and controls of FIGURE 2 are shown on the front panel 98.

In operation, for testing an SCR, plug the SCR 34 into the tester and turn switch 13 ($SW_1$) on. Move switch 31 to engage contact 29 and if light 18 turns on, a good SCR is being tested. Then move switch 31 to engage contact 26 and vary knob 22 and note voltage and current on meters 24 and 23. The minimum firing voltage may be determined by moving switch 31 to engage contact 28 and varying contact 21. When light 18 comes on the minimum firing voltage may be read on meter 24.

For testing a diode 51 open switch 13 and close switch $SW_2$. Place diode so that it engages contacts 47 and 48. If light 49 goes on, the diode is open or if light 54 goes on the diode has a short. If light 56 goes on the diode is good.

To test a transistor 77 open switch $SW_1$ and move contacts 67 and 68 ($SW_4$) to engage either on NPN or on PNP depending on the particular transistor.

The transistor tester is basically an audio oscillator, in which the transistor under test becomes an integral part of the circuit. The strength of oscillation provides a relative measure of the transistor's quality. Transformer 88 is used in a Hartley oscillator circuit and also as step-up transformer. Half of the primary serves as the transistor's collector load and the other half for audio feedback. Capacitor $C_7$ tunes the primary 89 of the transformer to raise the oscillation voltage on the secondary, to a level, in order to light the "good" lamp indicator 94. The brightness of the "good" lamp depends on the quality and characteristics of the under test "transistor." Emmitter current is measured by the brightness of the "bad" lamp 73, potentiometer $R_{12}$ sets the base current of the transistor under test, capacitor $C_6$ blocks D.C. from the base of the transistor. If the light 73 goes on the transistor is bad. If light 94 goes on the transistor is good.

The principles of the invention explained in connection with the specific exemplifications thereon will suggest many other applications and modifications of the same. It is accordingly desired that in construing the breadth of the appended claims they shall not be limited to the specific details shown and described in connection with the exemplifications thereof.

The contacts 37, 38, 39, 47, 48, 82, 77 and 78 on the front of the panel may be of a type which will allow leads to be connected for putting the output on a cathode ray tube, for example.

I claim as my invention:

1. An apparatus for testing electrical components comprising means for testing silicon controlled rectifiers having contacts for engaging the anode, cathode and gate of a silicon controlled rectifier, said means including conductor means connected to said anode and cathode contacts for connection to a source of power, a first indicator and an open circuiting switch connected in series circuit with the anode and cathode contacts, a gate switch connected to the gate contact and movable to first, second and third contacts, the first contact being an open circuit, the second contact being connected through a bilateral diode to an adjustable gate firing circuit including a potentiometer connected across said anode and cathode contacts, the third contact being connected to a second adjustable gate firing circuit including a second potentiometer and means for measuring gate voltage and current, means for testing a diode having contacts for engaging the anode and cathode of a diode, a second indicator, and a first diode with its anode connected to the anode contact connected between the diode contacts and the second indicator actuated if the diode being tested is open, a power supplying circuit including an open circuiting switch connected to said conductor means and having output leads with one lead connected to the anode contact and the second lead connected to the cathode contact through an impedance element, a second diode with its cathode connected to the cathode contact, a third indicator connected between the second lead of the power supplying circuit and the second diode to indicate if the diode being tested has a short circuit, and a fourth indicator connected between the second lead of the power supplying circuit and the cathode contact to indicate if the test diode is good.

2. Apparatus according to claim 1 including a capacitor connected across the fourth indicator.

3. Apparatus according to claim 1 including a transistor tester energizable by said conductor means.

4. An apparatus for testing electrical components comprising means for testing silicon controlled rectifiers having contacts for engaging the anode, cathode and gate of a silicon controlled rectifier, said means including conductor means connected to said anode and cathode contacts for connection to a source of power, a first indicator and an open circuiting switch connected in series circuit with the anode and cathode contacts, a gate switch connected to the gate contact and movable to first, second and third contacts, the first contact being an open circuit, the second contact being connected through a bilateral diode to an adjustable gate firing circuit including a potentiometer connected across said anode and cathode contacts, the third contact being connected to a second adjustable gate firing circuit including a second potentiometer and means for measuring gate voltage and current, a transistor tester with emitter, base and collector contacts, a rectifier circuit including an open circuiting switch connected to said conductor means and having output leads, the emitter contact and the collector contact connected to the rectifier output leads, a fifth indicator connected in series with the emitter and collector contacts, an oscillatory circuit connected to the emitter, collector and base contacts to form an oscillator with the test transistor, and sixth indicating means coupled to the oscillatory circuit to indicate a good transistor.

5. Apparatus according to claim 4 including means for varying the base current and meter means connected to the base contact to indicate base current.

6. Apparatus according to claim 5 including switching means connected between the rectifier circuit output leads and the emitter and collector contacts to reverse the polarity to those contacts for testing NPN or PNP type transistors.

7. Apparatus according to claim 5 wherein said oscillatory circuit includes a transformer with its primary connected between the base and collector contacts, and the sixth indicating means are connected to the secondary of the transformer.

8. Apparatus according to claim 4 including a diode tester energizable by said conductor means.

References Cited

UNITED STATES PATENTS

| 2,894,206 | 7/1959 | Montgomery | 324—158 |
| 2,895,106 | 7/1959 | Taunt | 324—158 |
| 3,237,104 | 2/1966 | Merkel | 324—158 |
| 3,193,766 | 7/1965 | Fleming | 324—158 |
| 3,277,371 | 10/1966 | Marcus | 324—158 |
| 3,332,015 | 7/1967 | Barber | 324—158 |

OTHER REFERENCES

E.E.E., "How to Measure Low Current SCR Characteristics" (D. R. Grafhan), vol. 14, No. 1, January 1966, pp. 48–52.

Electronic Design, "Self-Oscillating Beta Tester," July 22, 1959, pp. 76–77.

Electronics, "Dynamic Testers for Transistors" (L. G. Sands), vol. 33, No. 8, Feb. 19, 1960, pp. 66–67.

RUDOLPH V. ROLINEC, Primary Examiner

E. L. STOLARUN, Assistant Examiner

U.S. Cl. X.R.

324—51, 158